US006298664B1

United States Patent
Åsen et al.

(10) Patent No.: US 6,298,664 B1
(45) Date of Patent: Oct. 9, 2001

(54) PROCESS FOR GENERATING POWER INCLUDING A COMBUSTION PROCESS

(75) Inventors: Knut Ingvar Åsen, Heistad; Erik Sandvold, Porsgrunn, both of (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 09/445,301

(22) PCT Filed: Jul. 2, 1997

(86) PCT No.: PCT/NO97/00172

§ 371 Date: Dec. 21, 1999

§ 102(e) Date: Dec. 21, 1999

(87) PCT Pub. No.: WO98/55208

PCT Pub. Date: Dec. 10, 1998

(30) Foreign Application Priority Data

Jun. 6, 1997 (NO) .................................................... 972632

(51) Int. Cl.[7] .................................................. F01K 25/06
(52) U.S. Cl. ................................. 60/649; 60/651; 60/671
(58) Field of Search ............................ 60/648, 649, 651, 60/671

(56) References Cited

U.S. PATENT DOCUMENTS

| 5,007,240 | * | 4/1991 | Ishida et al. ...................... 60/649 X |
| 5,035,726 | | 7/1991 | Chen et al. ............................... 55/16 |
| 5,040,370 | * | 8/1991 | Rathbone ............................. 60/648 |
| 5,118,395 | | 6/1992 | Chen et al. ............................ 204/59 |
| 5,405,503 | * | 4/1995 | Simpson et al. ................... 60/648 X |
| 5,562,754 | | 10/1996 | Kang et al. . |
| 5,565,017 | | 10/1996 | Kang et al. ............................... 95/14 |
| 5,724,805 | | 3/1998 | Golomb et al. ..................... 60/39.02 |
| 5,806,316 | * | 9/1998 | Avakov et al. ......................... 60/649 |

FOREIGN PATENT DOCUMENTS

| 0 658 367 | 6/1995 | (EP) . |
| 0658366 | 6/1995 | (EP) . |
| 0658367 | 6/1995 | (EP) . |
| 0748648 | 12/1996 | (EP) . |
| 97/07329 | 2/1997 | (WO) . |

* cited by examiner

Primary Examiner—Hoang Nguyen
(74) Attorney, Agent, or Firm—Wenderoth, Lind & Ponack, L.L.P.

(57) ABSTRACT

The present invention relates to a process for generating power and/or heat in a combustion process having a fuel combusted with an oxygen-containing gaseous mixture as an oxidant supplied from a mixed conducting membrane capable of separating oxygen from oxygen-containing gaseous mixtures at elevated temperatures. The oxygen is picked up from the permeate side of the membrane by means of a sweep gas. The sweep gas can be obtained from at least one combustion process upstream the membrane. The sweep gas can be formed by mixing a recycled part of the exhaust gas containing oxygen and fuel which are passed over a catalytic or non-catalytic burner or combuster. The process produces a resultant exhaust gas with a high concentration of $CO_2$ and a low concentration of $NO_x$ making the exhaust gas stream suitable for direct use in different processes, for injection in a geological formation for long term deposition or for enhanced oil and natural gas recovery.

19 Claims, 4 Drawing Sheets

PROCESS FOR GENERATING POWER INCLUDING A COMBUSTION PROCESS

The present invention relates to a process for generating power and/or heat in a combustion process where a fuel is combusted with an oxidant and further comprising an improved method for reducing the emissions of $CO_2$ and oxides of nitrogen to the atmosphere from said combustion process.

Due to the environmental aspects of $CO_2$ and $NO_x$ and taxes on the emissions to the national authorities the possibilities for reducing the emissions of these compounds to the atmosphere from combustion processes, in particular from exhaust gas from gas turbines offshore, have been widely discussed.

Conventional combustion processes used for carbon containing fuels and where the oxygen source is air produce carbon dioxide concentrations of 3–15% in the exhaust gas, dependent on the fuel and the applied combustion and heat recovery process. The reason the concentration is this low is because air is made up of about 78% by volume of nitrogen.

Thus, a reduction in the emission of carbon dioxide makes it necessary to separate the carbon dioxide from the exhaust gas, or raise the concentration to levels suitable for use in different processes or for injection and deposition. The recovered $CO_2$ may for instance be injected to a geological formation for long term deposition or for enhanced recovery of oil from an oil and natural gas reservoir. $CO_2$ can be removed from exhaust gas by means of several separation processes e.g. chemical separation processes, physical absorption processes, adsorption by molecular sieves, membrane separation and cryogenic techniques. Chemical absorption for instance by means of alkanole amines, is e.g. considered as the most practical and economical method to separate $CO_2$ from power plant exhaust gas. The method, however, require heavy and voluminous equipment and will reduce the power output with about 10% or more. Therefore this method is not very suited to practical implementation in a power generation process. In natural gas based power plants the fuel cost comprises a substantial part of the total cost of electric power. A high efficiency is therefore very important in order to reduce the cost of electric power.

In the MEA (mono ethanol amine) process $CO_2$ from the cooled power plant exhaust gas reacts with aqueous solution of MEA in a absorption tower. Most of the $CO_2$ is thus removed from the exhaust gas before the exhaust gas is released to the atmosphere. The aqueous solution containing MEA-$CO_2$ compounds is pumped to a stripper section where the reaction is reversed through heating with steam. The $CO_2$ and water vapour leaving the stripper is then cooled and $CO_2$ leaves the separation plant for further treatment. The MEA process will generate waste materials. E.g. a 350 MW combined cycle power plant will produce about 4000 tons MEA degradation products per year which has to be destructed or stored.

In order to meet national $NO_x$ emission requirements different methods can be used, for instance burner modification, applications of catalytic burners, steam additions or selective catalytic reduction (SCR) of the $NO_x$ in the exhaust gas when air used in combustion processes some of the nitrogen is oxidised during the combustion to NO, $NO_2$ and $N_2O$ (referred to as thermal $NO_x$). At least 80–98% of the $NO_x$ formed arises from oxidation of nitrogen in said air. The rest arises from oxidation of the nitrogen content in the fuel. Lowering the peak combustion temperature is a very effective method of reducing the amount of $NO_x$ formed. Unfortunately this causes a substantial efficiency drop due to poor combustion or due to reduced temperature in the combustion chamber in a gas turbine system. SCR is an efficient method in reducing the $NO_x$ but require a reduction agent such as ammonia and an expensive catalyst installed downstream the combustion process.

One method to both increase the concentration of $CO_2$ in an exhaust gas and to reduce the $NO_x$ formation is to add pure oxygen to the combustion process instead of air. Commercial air separation methods (e.g. cryogenic separation or pressure swing absorption (PSA)) will require 250 to 300 KWh/ton oxygen produced. Supplying oxygen e.g. to a gas turbine by this methods will decrease the net power output of the gas turbine cycles by at least 20%. The cost of producing oxygen in a cryogenic unit will increase the cost of electric power substantially and may constitute as much as 50% of the cost of the electric power.

The main object of this invention was to arrive at a more efficient heat and/or power generating process comprising a combustion process which produce an exhaust gas with a high concentration of $CO_2$ and a low concentration of $NO_x$ making the exhaust gas stream suitable for direct use in different processes or for injection in a geological formation for long term deposition or for enhanced oil and natural gas recovery.

Another object of the invention was to supply oxygen to the combustion process which implies reduced energy demands compared to other known methods.

A further object was to utilise existing process streams in the power or heat generation plant in obtaining improved oxygen supply to the combustion process.

The problems mentioned above concerning reduced fuel efficiency and high costs can partly be solved by application of mixed conducting membranes which are defined as membranes made from materials with both ionic and electronic conductivity. Such a membrane can be a mixed oxygen ion and electron conducting membrane, for instance capable of separating oxygen from oxygen-containing gaseous mixtures at 400–1300° C. An oxygen partial pressure difference causes oxygen to be transported through the membrane by reduction of oxygen on the high oxygen partial pressure side (the feed side) and oxidation of oxygen ions to oxygen gas on the low oxygen partial pressure side (the permeate side). In the bulk of the membrane oxygen ions are transported by a diffusive process. Simultaneously the electrons flow from the permeate side back to the feed side of the membrane.

Application of these membranes is rather new technique and is generally known from European patent application no. 0658 367 A2 which describe separation of oxygen from air by means of a mixed conducting membrane which is integrated with a gas turbine system. Pure oxygen near atmospheric pressure or below and at high temperature is recovered from the permeate side of the conducting membrane. This, however, entail that the oxygen has to be cooled to below approximately 50° C. and recompressed to required process pressure before being added to the oxidation reactor or burner in a combustion process.

Supplying oxygen to a natural gas based power plant by means of mixed conducting membranes as described in said European application could reduce the energy consumption to about 120–150 KWh/ton oxygen produced and the loss in the power output from a gas turbine to about 10% compared to the use of a cryogenic unit as described above. The energy penalty, however, is still high and at the same level as in e.g. the $CO_2$ absorption recovery process because oxygen has to be cooled and recompressed before being added to the combustion process.

The inventors found to applicate the exhaust gas or a part of the exhaust gas, from the combustion process as sweep gas in a mixed conducting membrane unit to pick up oxygen from the membrane surface. By feeding the exhaust gas containing $CO_2$- and $H_2O$ to the permeate side of the membrane, oxygen could be picked up and supplied to a combustion process without intermediate cooling and recompression of the oxygen as required in the European application 0658367. This is possible because the recycled part of the exhaust gas is acting as a coolant in the combustion process instead of nitrogen which is acting as a coolant in conventional processes. The method will give and $O_2/CO_2/H_2O$ gaseous mixture for combustion rather than ordinary air. Thus, the said method comprises a first air-based power and/or heat generating process that generates an exhaust gas with a high concentration of nitrogen and a low concentration of $CO_2$ and a second power and/or heat generating system that generates an exhaust gas containing a high concentration of $CO_2$.

Application of a sweep gas in combination with a solid electrolyte membrane (SEM) to lower the oxygen partial pressure to increase the degree of oxygen removal or oxygen recovery is known from the U.S. Pat. No. 5,035,726. In this patent a method for purifying crude argon by selective permeation of oxygen through the membrane is disclosed. Crude argon is compressed and heated and fed to a membrane unit to produce an $O_2$ depleted argon stream. In order to improve the efficiency of gas separation by the membrane, the permeate side of the membrane is swept by available nitrogen supplied for instance from the cryogenic unit. The sweep gas is heated in a separate high temperature heat-exchanger. The application of sweep gas will reduce the partial pressure of oxygen on the permeate side of the membrane and thereby increase the flux of oxygen through the membrane. This advantage is also attainable in the present improved method for oxygen supply, but in this process available hot process or exhaust gas can be utilised as sweep gas.

More surprisingly, the inventors found that their method has the advantage of supplying oxygen to the combustion process without significant loss in the efficiency of the heat or power generation plant because the oxygen separation process can be operated with the same pressure on both sides of the mixed conducting membrane. In order to transport oxygen through the membrane, the concentration of oxygen in the sweep gas then must be lower than the concentration of oxygen in the oxygen containing gas on the feed side of the mixed conducting membrane. How a concentration gradient of oxygen can be feasible in this improved heat or power generation process is explained below.

The temperature in a combustion process is usually controlled and kept at a reasonable level by using excess air as coolant. The resulting exhaust gas still contains about 10–15% oxygen dependent on the type of fuel but an excess of approximately 1–3% oxygen is sufficient for complete combustion. Therefore the concentration of oxygen in the oxygen-containing sweep gas applied as an oxidant in the combustion process could be much lower than in air. In this improved power generating process where e.g. natural gas or a gasification product (without nitrogen) is used as fuel, an oxygen content between 3–11% in the sweep gas applied as an oxidant will be sufficient for the combustion.

No pressure gradient is lost since oxygen transferred to the permeate side of the mixed conducting membrane can be mixed with a sweep gas with the same total pressure as the oxygen-containing gas mixture on the feed side. Thus oxygen can be transferred from an air based power or heat generating system to a substantially nitrogen free power or heat generating system without any significant consumption of power or heat.

Though oxygen could be transferred to the sweep gas without any losses in efficiency of the power or heating system some losses will arise due to pressure drop in the gas distribution system to the membrane unit and due to pressure drop in the channels on each side of the membrane. In e.g. a pressurised system these losses will probably amount to less than 0.5 bar. An additional pressure drop of e.g. 0.5 bar will reduce the net power output of e.g. a natural gas fuelled combined cycle power plant with about 1%.

To obtain a sufficiently high flux of oxygen through the membrane a rather high temperature is required (400–1300° C.). On the air side of the membrane this is accomplished by using a burner to increase the temperature for instance as disclosed in European patent application no. 0 658 367 A2. Though the oxygen content will be reduced somewhat, this procedure is much cheaper than using a high temperature heat exchanger. If recycled $CO_2$ containing exhaust gas is used as sweep gas, the said gas could be pre-heated in a recuperator and further preheated in a catalytic or non catalytic burner. Further pre-heating in a catalytic or non-catalytic burner is feasible in the recycled $CO_2$-containing exhaust gas leaving the combustion process contains oxygen. Useful catalysts would be Pd/alumina washcoat on a cordierite monolith or Mn-substituted hexaaluminate catalyst or any oxidation catalyst capable of oxidation of hydrocarbon-, CO- or $H_2$-containing fuels. The non-catalytic burner could be of the same type as that used as cumbusters in industrial gas turbines or any burner capable of burning a fuel.

In another embodiment of the invention the mixed conducting membrane is coated downstream the gas turbine combuster. A separate unit for pre-heating recycled exhaust gas upstream the mixed conducting membrane as described above is then avoided. In this case the hot exhaust gas leaving said combuster is expanded in a gas turbine expander to a pressure giving a temperature sufficiently high for application of said mixed conducting membranes. The main part of the expanded or partially expanded exhaust gas is fed to a mixed conduction membrane and is, after further heat or power recovery, recycled and used as oxidant in the combustion process.

In a further embodiment of the invention the mixed conducting membrane is located downstream an indirectly fired heater which is a heater where the flame and products of combustion are separated from any contact with the principal material in the process by metallic or refractory walls. The combustion products leaving the indirectly fired heater is cooled in a heat recovery process to a temperature that gives sufficient transport of oxygen through the mixed conducting membrane. The main part of the exhaust gas is fed to a mixed conduction membrane and is, after further heat recovery, recycled and used as oxidant in the said fired heater.

Additional advantages of the improved heat or power generating process is reduced emissions of $NO_x$ due to the fact that very little nitrogen is introduced in the combustion system according to the present invention. This will also allow for development of improved and more efficient gas turbine or combustion systems since $NO_x$-reduction system is no longer required. $CO_2$ has a higher specific heat capacity than nitrogen and this will allow for development of more compact gas turbine systems and heat recovery systems, too.

Exhaust gas generated in the air-based power and heat generation system may contain less than 3–5% oxygen which allow for application in different chemical process, e.g. for purging purposes.

The scope of the invention in its widest sense is a process for generating power and/or heat in a combustion process where a fuel is combusted with an oxidant and further comprising an improved method for reducing emissions or carbon dioxide and reduced emission of oxides of nitrogen from said combustion process, where an $O_2/CO_2/H_2O$-containing gaseous mixture is supplied as oxidant to the combustion process and that said gaseous mixture is supplied from a mixed conducting membrane which is capable of separating oxygen from oxygen-containing gaseous mixtures at elevated temperatures and that the oxygen is picked up from the permeate side of the membrane by means of a sweep gas.

The sweep gas can be the product or part of the product from at least one combustion process upstream the mixed conducting membrane, or the sweep gas can be formed by mixing a recycled part of the exhaust gas containing oxygen and fuel which are passed over a catalytic or non-catalytic burner or cumbuster.

The sweep gas applied can also be either the main part of the expanded or partly expanded exhaust gas from a first and second combustion process upstream the membrane or be exhaust gas leaving an indirectly fired heater downstream a first combuster.

Oxygen can be removed from purged exhaust gas giving an exhaust gas containing 95–100% $CO_2$.

The exhaust gas, containing more than 90 volume % $CO_2$, can be purged from the process.

Air and fuel can be fed to a combuster and the air/exhaust mixture being fed to the feed side of the mixed conducting membrane where oxygen is depleted off giving an exhaust gas containing mainly nitrogen and $CO_2$.

Exhaust gas containing more than 90 volume % $CO_2$ will be suitable for enhanced oil and natural gas recovery or for injection in a geological formation. Exhaust gas containing $CO_2$ and possibly also oxygen is suitable in a chemical process as oxidant or coolant.

The invention will be further explained and envisaged in the example and corresponding figures.

Figure 1:
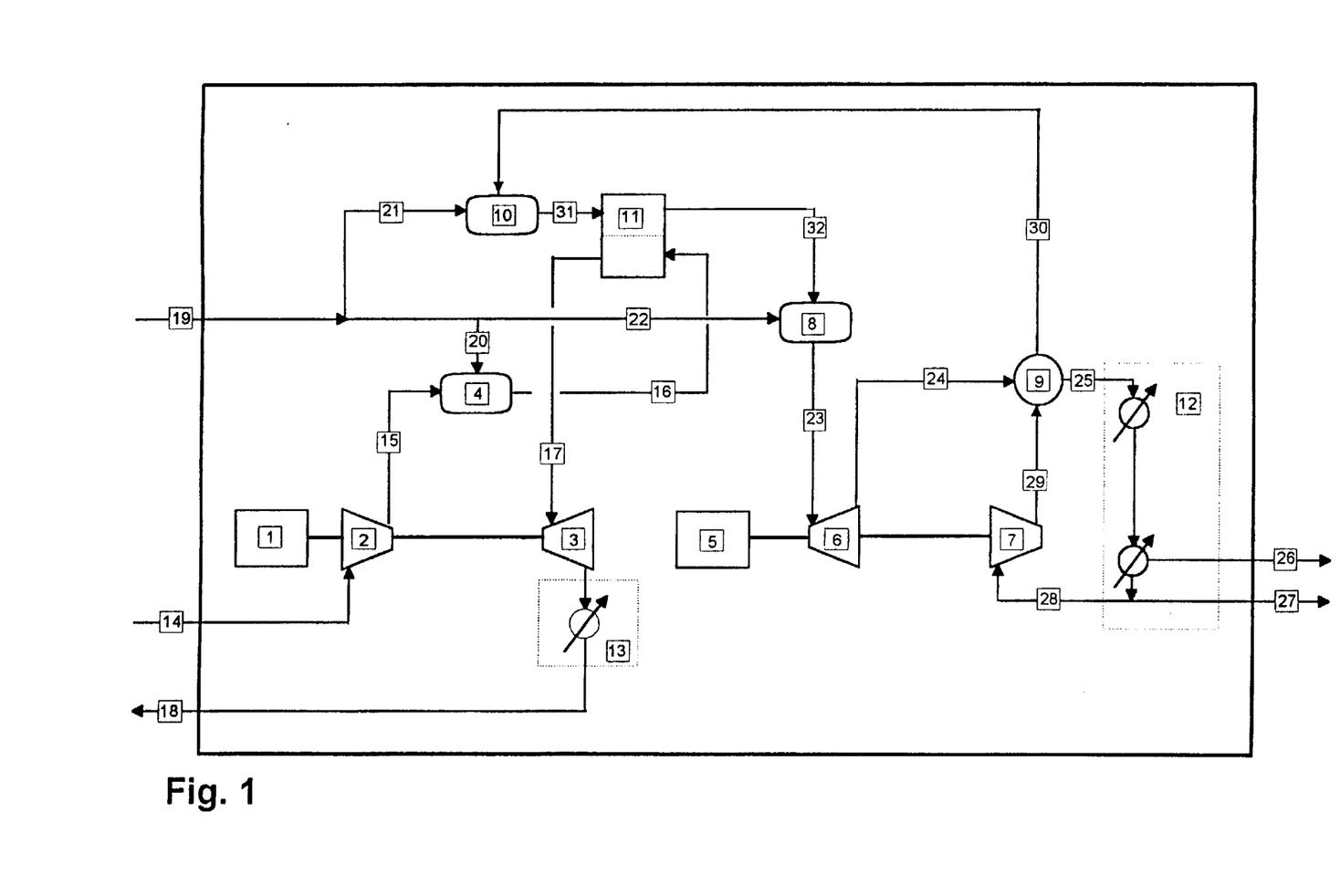
FIG. 1 shows a power and heat generating process according to the invention comprising a two stage combustion process where the mixed conducting membrane is located between the two combustion processes and where the first combustion process is applied as a sweep gas pre-heater.

FIG. 1 shows a combined power an heat generating process comprising application of a first air-based gas turbine system (2,3) which is integrated with a mixed conducting membrane unit (11) for supplying oxygen to a second gas turbine system (6,7) comprising a substantially nitrogen free combustion process.

Air (stream 14) is compressed in an industrial gas turbine 2,3 that is connected to an electrical power generator 1. The hot compressed air (stream 15) is fed to a combuster 4. One part of the fuel in stream 19 (stream 20), is combusted with the air in combuster 4. The hot air/exhaust mixture (stream 16) is fed to a membrane unit 11 and oxygen is depleted giving a oxygen depleted air stream 17. Stream 17 is expanded in unit 3 and heat can be recovered in unit 13. The cooled nitrogen-containing exhaust gas (stream 18) is discharged off. Recycled pressurised exhaust gas (stream 30) is mixed with fuel (stream 21) and the mixture is passed over a catalytic or non-catalytic burner 10. The product (stream 31; the sweep gas) from the burner 10 is fed to the membrane unit 11, preferably countercurrent to the air stream 16 and oxygen is recovered from the membrane surface. The hot recycled oxygen-containing exhaust gas (stream 32) and fuel (stream 22) is fed to a gas turbine combuster 8 where the fuel is combusted. The exhaust gas, stream 23, is expanded in gas turbine expander 6 that is connected to an electrical power generator 5. The resulting stream 24 is then heat exchanged in a recuperator 9 with recycled compressed exhaust gas (stream 29).

Partly cooled exhaust gas from recuperator 9 (stream 25) is fed to heat recovery system 12 and condensed water, stream 26, is separated off. Thereafter a part of the exhaust gas (stream 27) containing a high concentration of $CO_2$ is purged off. The main part of the exhaust gas (stream 28) is recycled and compressed in compressor 7 and is further pre-heated in recuperator 9 before being added to burner 10.

Figure 2:
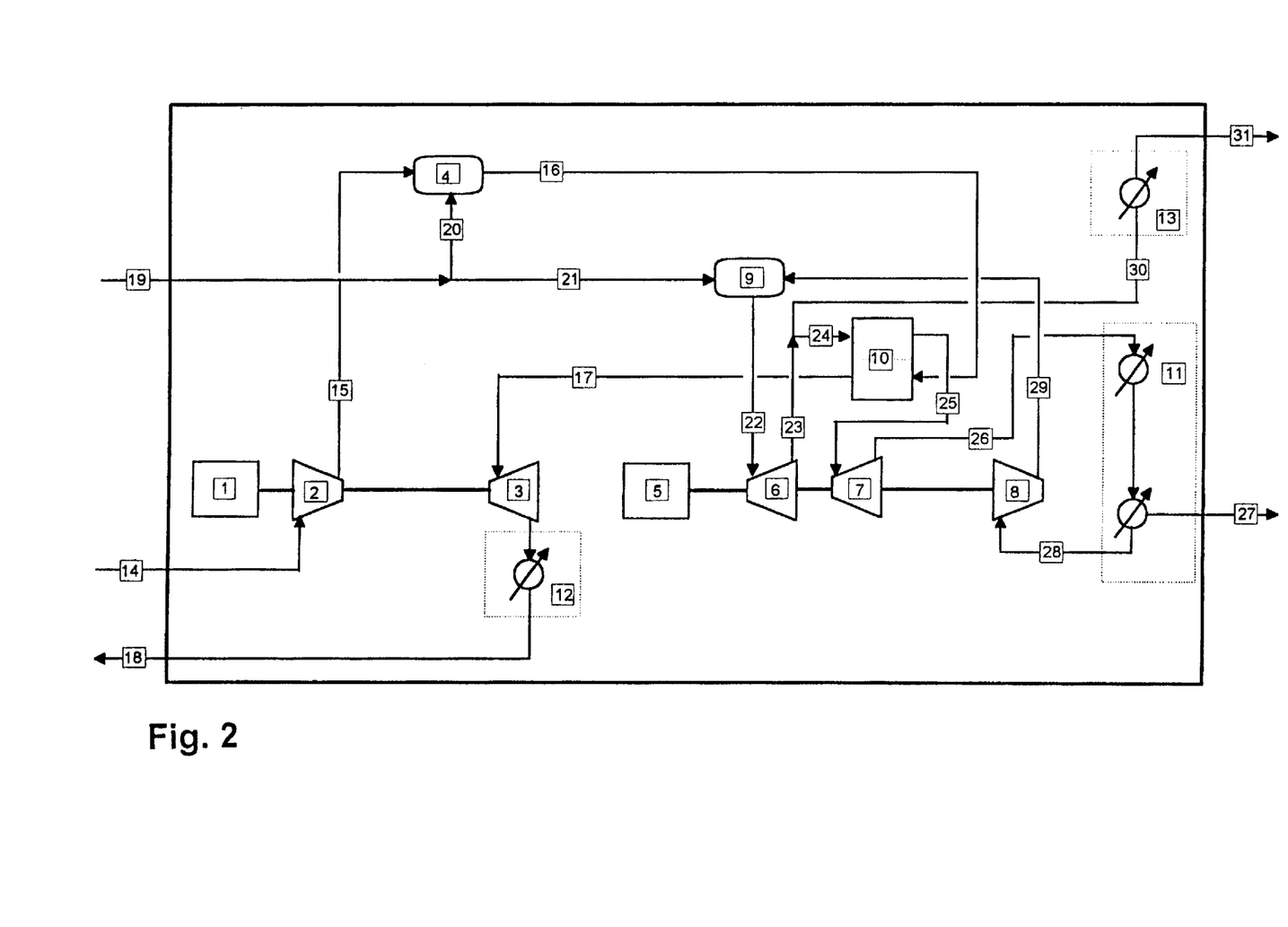
FIG. 2 shows a power and heat generating process according to the invention and where the mixed conducting membrane is located downstream the combuster between two expansion stages at medium pressure.

FIG. 2 shows a power generating process comprising application of a first air-based gas turbine system (2,3) which is integrated with a mixed conducting membrane unit (10) for supplying oxygen to a second gas turbine system 6,7 and 8 comprising a nearly nitrogen free combustion process and where the mixed conducting membrane is located between two expansion stages in the second gas turbine system.

Air (stream 14) is compressed in an industrial gas turbine 2,3 that is connected to an electrical power generator 1. The hot compressed air (stream 15) is fed to a combuster 4. One part of the fuel in stream 19 (stream 20) is combusted with the air stream in combuster 4. The hot air/exhaust mixture (stream 16) is fed to the membrane unit 10 and oxygen is depleted giving a depleted air stream 17. Stream 17 is expanded and heat can be recovered in unit 12. The cooled nitrogen-containing exhaust gas (stream 18) is discharged off.

Recycled pressurised exhaust gas (stream 29) and fuel (stream 21) is fed to a gas turbine combuster (9) where the fuel is combusted. The exhaust gas, (stream 22) is expanded in expander 6. Expander 6 is connected to an electrical power generator 5, to a medium pressure level and the main part of stream 23, stream 24; the sweep gas, is fed to the membrane unit 10, preferably countercurrent to the air stream 16 and oxygen is recovered from the membrane surface. A minor part of stream 23 (stream 30) is purged off and is treated in a heat recovery system 13 giving a cooled medium pressure stream 31 containing a high concentration of $CO_2$. The oxygen containing exhaust gas (stream 25) is further expanded in expander 7, which is on the same shaft as expander 6, to near atmospheric pressure and the resulting stream 26 is further fed to heat recovery system 11 where condensed water (stream 27) is separated off. The cooled oxygen containing exhaust gas (stream 28) is recycled and compressed in compressor 8 and is further added to combuster 9.

Figure 3:
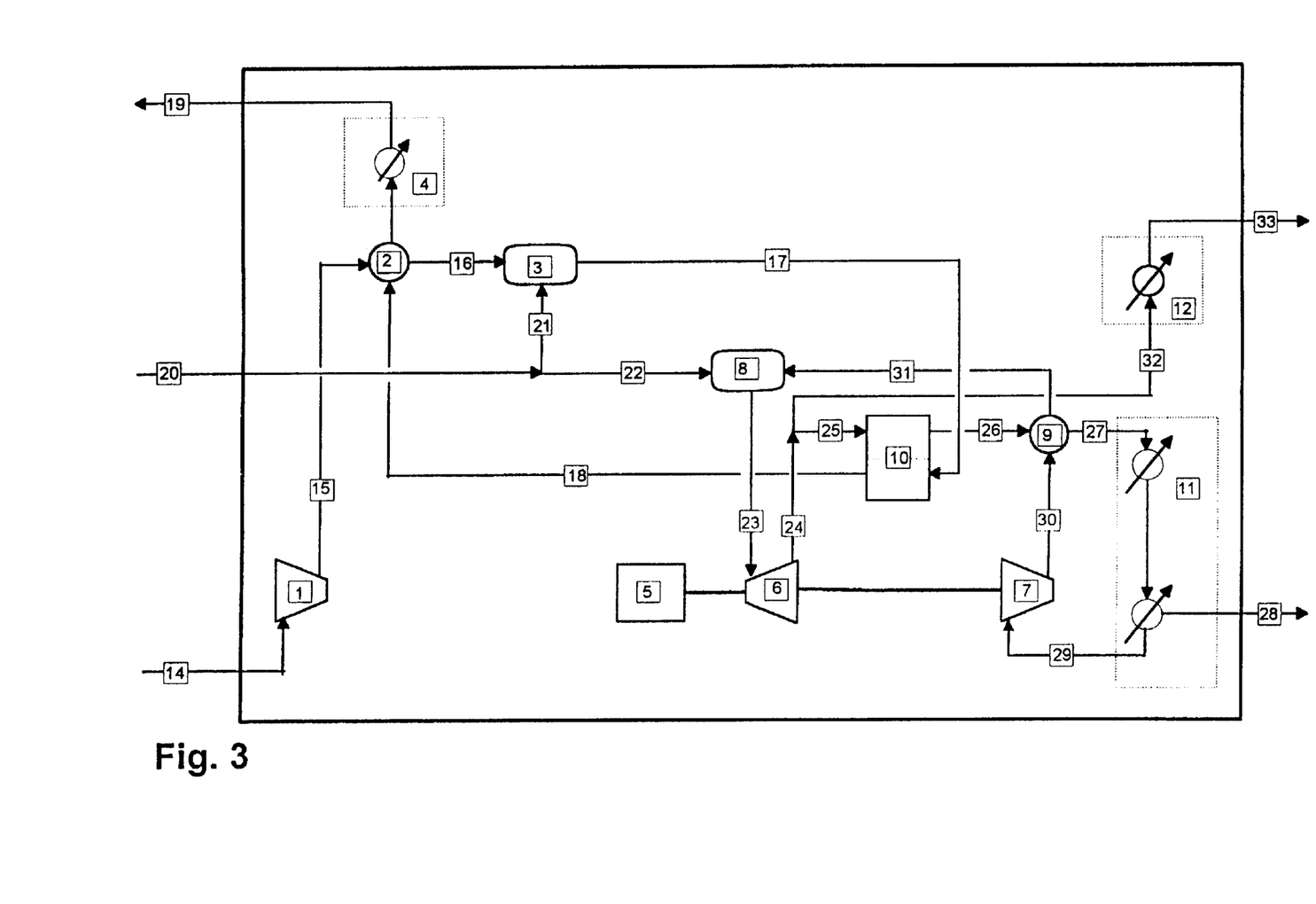
FIG. 3 shows a power and heat generating process according to the invention and where the mixed conducting membrane is located downstream an expansion unit at near atmospheric pressure.

FIG. 3 shows a power generation process comprising application of a first air-based heat generation system (units 1,2,3 and 4) which is integrated with a mixed conducting membrane unit 10 for supplying oxygen to a second gas turbine system 6,7 comprising a nearly nitrogen free combustion process and where the mixed conducting membrane is located downstream the expander.

Air (stream 14) is fed to a heat exchanger 2 by means of an air blower 1. The preheated air stream 16 is fed to a burner 3. One part of fuel stream 20 (stream 21) is combusted with air in burner 3. The hot air/exhaust mixture (stream 17) is fed to a membrane unit 10 and oxygen is depleted giving a depleted air stream 18. Stream 18 is heat exchanged with stream 15 and heat can be further recovered in heat recovery unit 4. The cooled nitrogen-containing exhaust or flue gas (stream 19) is discharged off.

Recycled pressurised exhaust gas (stream 31) and fuel (stream 22) is fed to a gas turbine combuster 8 where the fuel is combusted. The exhaust gas (stream 23) is expanded in expander 6, which is connected to an electrical power generator 5, to near atmospheric pressure and the main part of stream 24, stream 25; the sweep gas, is fed to the membrane unit 10 preferably countercurrent to the air stream 17 and oxygen is recovered from the membrane surface. A minor part of stream 24 (stream 32) is purged off, and is treated in a heat recovery system 12 giving a cooled stream 33 containing a high concentration of $CO_2$ at near atmospheric pressure. The oxygen containing exhaust gas (stream 26) is further heat exchanged in recuperator 9 with recycled exhaust gas (stream 30) and is further fed to heat recovery system 11 where condensed water (stream 28) is separated off. The cooled oxygen containing exhaust gas (stream 29) is recycled and compressed in compressor 7 and is further pre-heated in recuperator 9 before being added to combuster 8.

Figure 4:
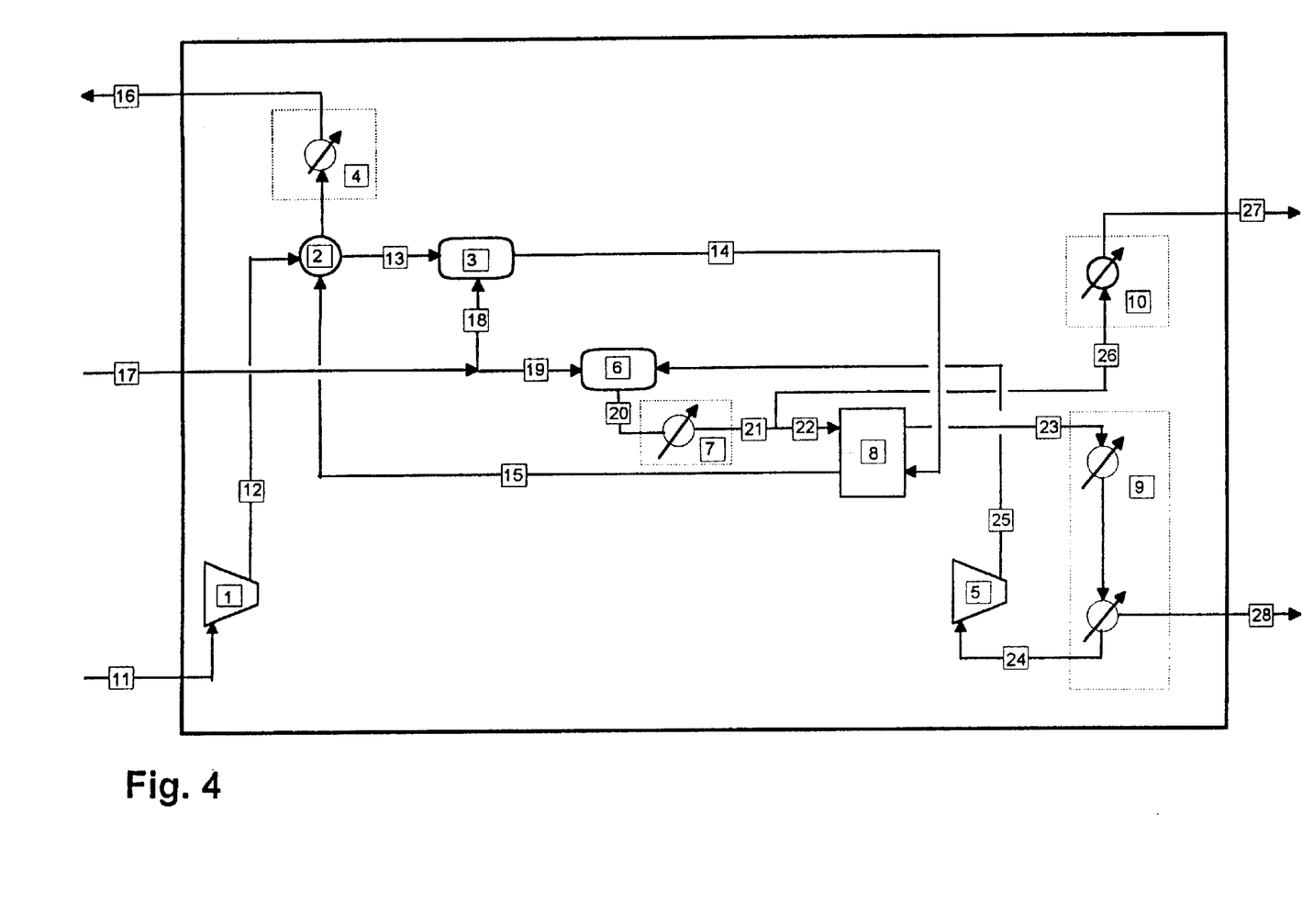
FIG. 4 shows a heat generating process according to the invention and where the mixed conducting membrane is located downstream an indirectly fired heater.

FIG. 4 shows a heat generating process comprising application of a first air-based heat generating system (units 1,2,3 and 4) which are integrated with a mixed conducting membrane unit 8 for supplying oxygen to a second heat generating system (units 5,6,7,9 and 10) comprising a nearly nitrogen free combustion process.

Air (stream 11) is fed to a heat exchanger 2 by means of an air blower 1. The preheated air stream (stream 13) is fed to a burner 3. Part of fuel stream 17 (stream 18) is combusted in the air stream in burner 3. The hot air/exhaust mixture (stream 14) is fed to a membrane unit 8 and oxygen is depleted giving a depleted air stream 15. Stream 15 is heat exchanged with stream 12 and heat can be further recovered in heat recovery unit 4. The cooled nitrogen-containing exhaust or flue gas (stream 16) is discharged off.

Recycled pressurised exhaust gas (stream 25) and fuel (stream 19) is fed to a burner (6) where the fuel is combusted. The exhaust gas, (stream 20) is fed to a heat recovery system 7 and the main part of stream 21, stream 22; the sweep gas, is fed to the permeate side of membrane unit 8, preferably countercurrent to the air stream 14 and oxygen is recovered from the membrane surface. A minor part of the partly cooled exhaust gas (stream 26) is purged off and is treated in a heat recovery system 10 giving a cooled stream 27 containing a high concentration of $CO_2$ at near atmospheric pressure. The oxygen containing exhaust gas (stream 23) is further fed to heat recovery system 9 and eventually condensed water (stream 28) is separated off. The cooled oxygen containing exhaust gas (stream 24) is recycled to burner 6 by means of a blower 5.

EXAMPLE 1

This example shows a power generating process as described in FIG. 1.

Air (stream 14) is compressed without intermediate cooling to between 6 and 30 bara in an industrial gas turbine 2,3 that is connected to an electrical power generator 1. The hot compressed air (stream 15) is fed to a combuster 4. One part of the fuel in stream 19 (stream 20), is combusted with the air in combuster 4 thus heating the air to between 400 and 1300° C. The required temperature depends on the selected membrane material. The hot air/exhaust mixture (stream 16) is fed to the membrane unit 11 and oxygen is depleted giving a oxygen depleted air stream 17. Stream 17 is expanded to near atmospheric pressure in unit 3 connected to a mechanical or electrical power generating unit 1, and heat can be recovered in unit (13). The cooled nitrogen-containing exhaust gas (stream 18) is discharged off. The said exhaust gas may contain less than 3–5% oxygen which allow for application in different chemical processes, e.g. for purging purposes.

Between 60 and 100% of the generated $CO_2$ can be recovered as high concentrated $CO_2$ dependent on the composition of the fuel and the amount of fuel added to combuster 4, If e.g. hydrogen is available as a fuel to the air-based gas turbine system 2,3 or if a membrane temperature between 500 and 600° C. is sufficient, 100% of the generated $CO_2$ can be recovered as high concentrated $CO_2$. Since most of the fuel is consumed in the second gas turbine system 6,7 at a very high efficiency, a low efficiency in the first gas turbine system caused by a low temperature inlet the expander will to a low degree influence the total fuel efficiency.

Recycled pressurised exhaust gas (stream 30), containing $CO_2$, water and oxygen, is mixed with fuel (stream 21) and the mixture is passed over a catalytic burner 10 thus heating up the gas mixture to between 500 and 1300° C. increased temperature and oxygen concentration allow for increased temperature for the sweep gas (stream 31).

The sweep gas, stream 31, is fed to the membrane unit 11, preferably countercurrently to the air stream 16 and oxygen is recovered from the membrane surface, thus increasing the oxygen content of the recycled exhaust gas to between preferably 3 and 10%. The hot oxygen containing recycled exhaust gas (stream 32) and fuel (stream 22) is fed to a gas turbine combuster 8 where the fuel is combusted giving a high gas temperature (>1000° C.). Stream 23 is expanded in gas turbine expander 6 that is connected to an electrical power generator unit 5. The resulting stream 24 is then heat exchanged in recuperator 9 with recycled compressed exhaust gas (stream 29).

The high heat capacity of carbon dioxide compared to nitrogen gives a higher temperature of the exhaust gas leaving the expander than in an air blown gas turbine system. Further the compression of recycled exhaust gas will give a lower temperature than the compression of air to the same pressure. This will allow for application of a recuperator at pressure ratios up to at least 30. Pre-heating of recycled compressed exhaust gas in a recuperator or heat exchanger will increase the efficiency of the power plant.

The ratio between $H_2O$ and $CO_2$ in the recycled exhaust gas (stream 28) will increase with an increasing temperature of the exhaust gas leaving the heat recovery system 12. A higher temperature of the gas mixture entering the compression section of the $CO_2$-based gas turbine system 6,7 will, however, reduce the temperature difference between stream 24 and stream 29 thus reducing the benefit of installing a recuperator.

Partially cooled exhaust gas from recuperator 9 (stream 25), is fed to heat recovery system 12 and condensed water (stream 26) is separated off. Thereafter a stream 27 containing an amount of $CO_2$, corresponding to the number of mole carbon in fuel added to the combuster 8, is purged off. About 85–97% of the CO$_2$-containing exhaust gas is recycled (stream 28) and compressed in unit 7 and is further preheated in recuperator 9 before being added to the catalytic burner 10.

If the concentrated CO$_2$-containing gas stream 27 is injected to an oil and gas reservoir for enhanced oil and natural gas recovery the said stream 27 should be treated in catalytic deoxo-reactor to get rid of the oxygen.

An alternative configuration of the gas turbine system comprises that the air compressor is located on the same shaft as the exhaust gas-recycle compressor. This configuration secure that enough power is available for the compression of air in unit 2.

An alternative configuration of the power and heat generating process comprising a process according to FIG. 1 and where an additional mixed conducting membrane is located downstream the expansion unit 6, but upstream recuperator 9. This configuration will reduce the required partial pressure of oxygen in stream 32 thus increasing the flux of oxygen through the membrane in unit 11.

In the process according to FIG. 1 more than 60% of the CO$_2$ generated in the combustion processes in units 4, 10 and 8, can be recovered as a highly concentrated CO$_2$-containing exhaust gas. The said exhaust gas, which is purged off, contains oxygen and a insignificant amount of NO$_x$, and is thus applicable as an oxidant in different chemical processes where nitrogen is not desired or the said exhaust gas may be injected to a geological formation for long term deposition. Known power and heat generating methods are producing exhaust gases containing less than approximately 10% CO$_2$ which require application of an expensive, voluminous and heavy CO$_2$-separation plant if e.g. deposition of CO$_2$ is essential. In order to remove NOx in these known processes a separate expensive catalytic system has to be installed. Compared to other known methods (e.g. cryogenic air separation) comprising supply of pure oxygen to recycled exhaust gas, the present invention will both increase the power efficiency of the plant and substantially reduce the cost of generation and supply of oxygen to combustion processes. Since the generated CO$_2$-containing oxidant contains less oxygen than in air, serious risks due to handling of pure oxygen is avoided.

EXAMPLE 2

This example shows a power generating process as described in FIG. 2.

Air (stream 14) is compressed to between 6 and 30 bara in an industrial gas turbine 2,3 that is connected to an electrical power generator unit 1. The hot compressed air (stream 15) is fed to a combuster 4. One part of the fuel in stream 19 (stream 20) is combusted in the air stream in combuster 4. The hot air/exhaust mixture (stream 16) is fed to a membrane unit 10 and oxygen is depleted giving a depleted air stream 17. Stream 17 is expanded to near atmospheric pressure and heat can be recovered in unit 12. The cooled nitrogen-containing exhaust gas (stream 18) is discharged off. The said exhaust gas may contain less than 3–5% oxygen which allow for application in different chemical processes, e.g. for purging purposes.

Lowering the temperature of the air-containing gas entering the mixed conducting membrane (stream 16) by feeding less fuel to the air-blown gas turbine burner, will increase the part of the generated CO$_2$ which can be recovered from the exhaust gas containing a high concentration of CO$_2$. Dependent on the composition of the fuel, and the temperature of 700 to 1000° C. of the air containing gas, between 90 and 75% of the generated CO$_2$ can be recovered as highly concentrated CO$_2$ gas at 5 to 20 bara suitable for e.g. long term deposition or enhanced oil and natural gas recovery.

Recycled pressurised exhaust gas (stream 29) between 15 and 40 bar and compressed fuel (stream 21) is fed to a gas turbine combuster (9) where the fuel is combusted. The hot exhaust gas (temperature>1000–1300° C.), (stream 22) is expanded in expander 6, which is connected to an electrical power generator unit (5), to between 5 and 20 bara and the main part of stream 23, (stream 24; the sweep gas), is fed to the membrane unit 10, preferably countercurrent to the air stream 16 and oxygen is recovered from the membrane surface. Between 3 and 15% of stream 23 (stream 30) is purged off and is treated in a heat recovery system (13) giving a cooled medium pressure stream 31 containing more than 95% CO$_2$. If combuster 9 is operated at stoichiometric ratio between fuel and oxygen or slightly below this stoichiometric ratio, the CO$_2$-containing stream 31 contains a insignificant amount of oxygen and the gas could thus be used for enhanced oil and natural gas recovery without further treatment. If desirable, stream 30 could be expanded to atmospheric pressure in a separate expander to recover heat directly as power.

The oxygen containing exhaust gas (stream 25) is further expanded in 7 to near atmospheric pressure and is further fed to heat recovery system 11 and condensed water (stream 27) is separated off. If the temperature in stream 28 is above approximately 90° C., no water is condensed in 11. In that case the recycled exhaust gas (stream 28) could contain about 60% H$_2$O, 30% CO$_2$ and 10% O$_2$ if natural gas is used as fuel. The cooled oxygen containing exhaust gas (stream 28) is recycled and compressed in compressor 8 and is further added to combuster 9.

An alternative configuration of the power and heat generating process comprising a process according to FIG. 2 and where the high concentrated CO$_2$-containing exhaust gas is purged off from the process downstream the conducting membrane unit 10. The said gas may then contain more than 7% oxygen and may be applied as an oxidant in different chemical processes where nitrogen is an undesired component.

In the process according to FIG. 2 more than 60% of the CO$_2$ generated in the combustion processes in units 4 and 9, can be recovered as a highly concentrated CO$_2$-containing exhaust gas at 10 bara or higher. The said exhaust gas, which is purged off, may contain a very low concentration of O$_2$ and can thus be applied for enhanced oil and natural gas recovery without further treatment, or the said exhaust gas may be injected to a geological formation for long term deposition. Recovering the said exhaust gas at elevated pressure saves compression equipments for recompression of the said exhaust gas if injected. Further, in the process according to FIG. 2, partially expanded exhaust gas is applied as sweep gas in the conducting membrane unit 10. A separate combustion process for pre-heating the sweep-gas is then avoided.

EXAMPLE 3

This example shows a power generation process as described in FIG. 3.

Air (stream 14) is fed to a heat exchanger 2 by means of an air blower 1. The preheated air stream (stream 16) is fed to a burner 3. One part of fuel stream 20 (stream 21) is combusted with air in burner 3 thus heating the air/exhaust containing gas mixture to between 700 and 1000° C. The hot air/exhaust mixture (stream 17) is fed to a membrane unit 10 and oxygen is depleted giving a depleted air stream 18. Stream 18 is heat exchanged with stream 15 and heat can be further recovered in heat recovery unit 4. The cooled nitrogen-containing exhaust or flue gas (stream 18) is discharged off. The said exhaust gas may contain less than 3–5% oxygen which allow for application in different chemical processes, e.g. for purging purposes.

Recycled pressurised exhaust gas (stream 31) and fuel (stream 22) is fed to a gas turbine combuster 8 where the fuel is combusted. The exhaust gas (temperature>1000–1300° C.) (stream 23) is expanded in expander 6, which is connected to an electrical power generator 5, to near atmospheric pressure. Between 85 and 97% of stream 24, stream 25; the sweep gas, is fed to the membrane unit 10, preferably countercurrent to the air stream 17 and oxygen is recovered from the membrane surface. In order to get a sufficient high temperature (i.e. above approx. 700° C.) of the exhaust gas used as sweep gas in the mixed conducting membrane the compression ratio in the nitrogen free gas turbine process should preferably be below approximately 20:1. The minor part of stream 24, stream 32, is purged off and is treated in a heat recovery system 12 giving a cooled stream 33 containing a high concentration of $CO_2$ at near atmospheric pressure. If combuster 8 is operated at soichiometric ratio between fuel and oxygen or slightly below this stoichiometric ratio, the $CO_2$-containing stream 33, contains an insignificant amount of oxygen and the gas thus could be used for enhanced oil and natural gas recovery without further treatment.

The oxygen containing exhaust gas (stream 26) is further heat exchanged in recuperator 9 with recycled exhaust gas (stream 30) and is further fed to heat recovery system (11) and condensed water (stream 28) is separated off. The cooled oxygen-containing exhaust gas, (stream 29), is recycled and compressed in compressor 7 and is further pre-heated in recuperator 9 to above 500° C. before being added to combuster 8.

In the process according to FIG. 3 more than 60% of the $CO_2$ generated in the combustion processes in units 3 and 8, can be recovered as a highly concentrated $CO_2$-containing exhaust gas at atmospheric pressure. The said exhaust gas, which is purged off, may contain a very low concentration of $O_2$ and can thus be applied for enhanced oil and natural gas recovery without further treatment, or the said exhaust gas may be injected to a geological formation for long term deposition. Further, in the process according to FIG. 3, exhaust gas expanded to near atmospheric pressure is applied as sweep gas in the conducting membrane unit 10. The expansion of the combusted gas (steam 23) can then be accomplished in one expansion unit 6 without taking partially expanded gas out and in of the expansion process. Since the mixed conducting membrane 10 is operating at near atmospheric pressure, air (stream 14) can be supplied to the process without the need for a separate air based gas turbine system as required in the process configuration shown in FIGS. 1 and 2. This will reduce the complexity of the power and heat generation process.

EXAMPLE 4

This example shows a power generating process as described in FIG. 4.

Air (stream 11) is fed to a heat exchanger 2 by means of an air blower 1. The preheated air stream (stream 13) is fed to a burner 3. Part of fuel stream 17 (stream 18) is combusted in the air stream in burner 3. The hot air/exhaust mixture (stream 14) is fed to a membrane unit 8 and oxygen is depleted giving a depleted air stream 15. Stream 15 is heat exchanged with stream 12 and heat can be further recovered in heat recovery unit 4. The cooled nitrogen-containing exhaust or flue gas (stream 16) is discharged off. The said exhaust gas may contain less than 3–5% oxygen which allows for application in different chemical processes, e.g. for purging purposes.

Recycled pressurised exhaust gas, (stream 25), and fuel (stream 19) is fed to a burner (6) where the fuel is combusted. The exhaust gas, stream 20, is fed to a heat recovery system 7. The heat recovery system could be integrated with burner 6 and units 6 and 7 can be e.g. an indirectly fired heater comprising units like column reboilers, fractionating-column feed preheaters, reactor-feed preheaters, fired steam boilers and indirectly fired reactors. The main part of stream 21, stream 22; the sweep gas, is fed to the permeate side of membrane unit 8, preferably countercurrent to the air stream 14 and oxygen is recovered from the membrane surface. A minor part of the partially cooled exhaust gas (stream 26) is purged off and is treated in a heat recovery system 10 giving a cooled stream 27 containing a high concentration of $CO_2$ at near atmospheric pressure. The oxygen containing gas (stream 23) is further fed to heat recovery system 9 and eventually condensed water (stream 28) is separated off. The cooled oxygen containing exhaust gas, stream 24, is recycled to burner 6 by means of a blower 5.

In the process according to FIG. 4 more than 60% of the $CO_2$ generated in the combustion processes in units 3 and 8, can be recovered as a high concentrated $CO_2$-containing gas at atmospheric pressure. The said gas may be injected to a geological formation for long term deposition. If the said gas is purged of from the process downstream the conducting membrane 8 the said gas may contain more than 7% oxygen and a not significant amount of $NO_x$ and may thus be applied as an oxidant in different chemical processes where nitrogen is an undesirable component. The process according to FIG. 4 can be applicated for generation of heat in different chemical processes where removal of $CO_2$ is essential and could substantially reduce the cost of such removal compared to other known methods. The method according to the invention could e.g. be applied in processes comprising units like fired column reboilers, fired fractionating-column feed preheaters, fired reactor-feed preheaters, fired steam boilers and indirect fired reactors.

The fuel useful in the processes described in examples 1–4 comprises natural gas, methanol, synthesis gas comprising hydrogen and carbon monoxide, refinery fuel gas containing mixed hydrocarbons or other combustible gas mixtures.

By the present invention the inventors have arrived at a flexible power and/or heat generating process comprising an improved method for reducing the emissions of $CO_2$ and oxides of nitrogen to the atmosphere from the exhaust gas by generation of an exhaust gas containing a high concentration of carbon dioxide and an insignificant concentration of nitrogen oxides. The exhaust gas is therefore suitable for direct use in different processes or for injection and deposition. Exhaust gas consisting of more than 95% $CO_2$ can be generated without significant loss in the efficiency of the power or heat generation. About 60 to 100% of the $CO_2$ generated in the power plant can be recovered in the exhaust gas containing the high concentration of $CO_2$.

The above advantages are obtained by application of a sweep gas for the permeate side of a mixed conductive membrane and where the sweep gas is made up of available hot $CO_2$-containing exhaust gas. Thus the application of a sweep gas in said processes does not require supply of additional gases or any additional supply of fuel or energy. The described application of mixed conductive membranes can in principle be used in the same way for several types of power or heat generating processes e.g. in Combined Cycle Power Plants or in Integrated Gasification and Combined Cycle power plants or in any processes comprising combustion of a fuel.

Since oxygen transferred from an oxygen-containing gas mixture on the feed side to the permeate side of the mixed conducting membrane can be mixed with a sweep gas with the same total pressure as the oxygen-containing gas mixture on the feed side no, pressure gradient is lost. Oxygen thus can be transferred from an air based power or heat generating system to a nitrogen free power or heat generating system without any significant consumption of power or heat

What is claimed is:

1. A process for generating heat or power, or both, comprising:

providing a mixed conducting membrane unit comprising a mixed oxygen ion and electron conducting membrane having a feed side and a permeate side, wherein oxygen flows from the feed side to the permeate side of the membrane;

supplying the feed side of the membrane with an air/exhaust mixture containing oxygen, nitrogen and $CO_2$, wherein oxygen is removed from the air/exhaust mixture by the membrane, forming an oxygen-depleted exhaust gas containing nitrogen and $CO_2$;

combusting a mixture of a carbon containing fuel and oxygen/$CO_2$/$H_2O$ containing gaseous mixture as an oxidant to form a sweep gas;

supplying the permeate side of the conducting membrane with the sweep gas, wherein said sweep gas, as it is passed through the conducting membrane unit, picks up oxygen removed from the feed side, forming an oxygen-enriched $CO_2$/$H_2O$ containing gaseous mixture which may be recycled as an oxidant in a subsequent combustion reaction;

optionally combusting the oxygen-enriched $CO_2$/$H_2O$ containing gaseous mixture to form a $CO_2$/$H_2O$ containing exhaust gas, and feeding either the $CO_2$/$H_2O$ containing exhaust gas or oxygen-enriched $CO_2$/$H_2O$ containing gaseous mixture into a recovery system for heat or power, or both, thereby generating heat or power, or both.

2. The process according to claim 1, wherein the oxygen is depleted from the air/exhaust mixture at an elevated temperature.

3. The process according to claim 1, wherein the mixture of carbon containing fuel and oxidant is combusted in a catalytic or non-catalytic combuster.

4. The process according to claim 1, wherein the $CO_2$/$H_2O$ containing exhaust gas is fed to a heat exchanger, to transfer heat from the $CO_2$/$H_2O$ containing exhaust gas to another gas.

5. The process according to claim 1, wherein the sweep gas comprises an exhaust gas from a combustion process upstream of the membrane which is at least partly expanded.

6. The process according to claim 1, wherein the sweep gas comprises an exhaust gas produced by an indirectly fired heater.

7. The process according to claim 1, wherein the oxygen-depleted exhaust gas resulting from the air/exhaust mixture fed to the feed side of the membrane is mainly nitrogen.

8. The process according to claim 1, wherein the $CO_2$/$H_2O$ containing exhaust gas comprises at least 90% by volume of $CO_2$.

9. The process according to claim 8, wherein the $CO_2$/$H_2O$ containing exhaust gas is purged.

10. The process according to claim 8, wherein after feeding the $CO_2$/$H_2O$ containing exhaust gas into a recovery system, the exhaust gas is compressed and injected into an oil and gas reservoir for enhancing oil recovery.

11. The process according to claim 8, wherein after feeding the $CO_2$/$H_2O$ containing exhaust gas into a recovery system, the exhaust gas is compressed and injected into a geological formation.

12. The process according to claim 8, wherein water and oxygen are subsequently removed from the $CO_2$/$H_2O$ containing exhaust gas.

13. The process according to claim 12, wherein said $CO_2$/$H_2O$ containing exhaust gas comprises between about 95 to 100% by volume of $CO_2$ after the removal of water and oxygen.

14. The process according to claim 8, wherein the $CO_2$/$H_2O$ containing exhaust gas also contains oxygen.

15. The process according to claim 8, wherein the $CO_2$/$H_2O$ containing exhaust gas is incorporated as an oxidant or as a coolant in a chemical process.

16. The process according to claim 1, wherein the oxygen-depleted exhaust gas is passed through a heat recovery system to recover heat.

17. The process according to claim 1, wherein the $CO_2$/$H_2O$ containing exhaust gas is fed to an expander, which is connected to an electrical power generator, for generation of power.

18. The process according to claim 17, which after being fed to the expander, the $CO_2$/$H_2O$ containing exhaust gas is fed to a heat recuperator to recover heat from the exhaust gas.

19. The process according to claim 1, wherein the $CO_2$/$H_2O$ containing exhaust gas is fed to a heat recovery system, for generating heat from the resultant exhaust gas.

* * * * *